United States Patent [19]

Komeya et al.

[11] Patent Number: 4,693,857
[45] Date of Patent: Sep. 15, 1987

[54] METHOD FOR PRODUCTION OF SINTERED ARTICLE OF SILICON NITRIDE

[75] Inventors: Katsutoshi Komeya, Ohiso; Michiyasu Komatsu, Yokohama, both of Japan

[73] Assignee: Kabushiki Kaisha Toshiba, Japan

[21] Appl. No.: 716,212

[22] Filed: Mar. 26, 1985

[30] Foreign Application Priority Data

Mar. 29, 1984 [JP] Japan ................................ 59-61821

[51] Int. Cl.$^4$ ............................................. C04B 33/32
[52] U.S. Cl. ....................................... 264/56; 264/86; 501/97; 501/98
[58] Field of Search ...................... 264/86, 56; 501/97, 501/98

[56] References Cited

U.S. PATENT DOCUMENTS 4,113,503  9/1978  Lumby et al. ......................... 501/98
4,147,759  4/1979  Demit .................................... 501/97
4,496,503  1/1985  Ezis et al. ............................. 264/86

OTHER PUBLICATIONS

Sakai et al., Yogyo Kyokai-shi 86[3], 1978, pp. 125–130.
Sakai et al., Yogyo-Kyoaki 86[3], 1978, pp. 174–179.
McCauley et al., "High Temperature Reactions and Microstructures in the $Al_2O_3$–AlN System," Nitrogen Ceramics, pp. 111–118 (1983).
Chemical Abstracts, vol. 101, No. 2, Jul. 1984, p. 252, No. 11476q.
Chemical Abstracts, vol. 100, No. 14, Apr. 1984, p. 286, No. 108058x.
Lewis, M. H. and Lumby, R. J., "Nitrogen Ceramics: Liquid Phase Sintering," Powder Metallurgy, vol. 26, No. 2 (London, 1983).
Cother, N. E. and Hodgson, D., 81 Trans, J. Br. Ceram. Soc., pp. 141–144 (Codridge, Stoke-on-Trent, 1982).

*Primary Examiner*—James Derrington
*Attorney, Agent, or Firm*—Finnegan, Henderson, Farabow, Garrett & Dunner

[57] ABSTRACT

As the aluminum nitride component of a sintering aid for powdered silicon nitride, either a spinel type compound having oxygen dissolved in aluminum nitride to form a solid solution or a poly-type aluminum nitride is used. Since the compound is highly stable in water, it can be effectively used in the form of an aqueous slurry mixture. As the sintering aid, this compound is used as effectively as aluminum nitride.

3 Claims, No Drawings

METHOD FOR PRODUCTION OF SINTERED ARTICLE OF SILICON NITRIDE

BACKGROUND OF THE INVENTION

This invention relates to a method for the production of a sintered article of silicon nitride.

The sintered ceramic articles formed preponderantly of silicon nitride possess heat resisting property enough to withstand elevated temperatures up to 1900° C., exhibit a low thermal expansion coefficient, and excel in resistance to thermal shock. Thus, the feasibility of these articles in applications to structural parts such as gas turbine blades and nozzles which require high strength at elevated temperatures is being studied.

Shaped articles formed solely of silicon nitride powder have a poor capacity for sintering. It has been customary, therefore, to produce sintered articles of silicon nitride powder by blending the silicon nitride powder with a sintering aid such as the oxide of a rare earth element like yttrium oxide ($Y_2O_3$), aluminum oxide ($Al_2O_3$), or aluminum nitride (AlN), molding the resultant mixture in a given shape, and sintering the shaped mixture by the hot press method, the normal sintering method, or the gas pressure sintering method.

As means of forming such shaped articles of silicon nitride, numerous methods have been known such as the pressure molding method applying of pressure to powder, injection molding method using blended materials and the slip casting method using slurry blends. Particularly, the molding method involving slurry blends is known for its ability to permit such slurry blend to be easily and inexpensively molded in a complex shape.

When silicon nitride powder and an aluminum nitride sintering aid are mixed and graded in water to produce a slurry, the aluminum nitride reacts with water and undergoes decomposition, converting itself into $Al_2O_3$ with evolution of ammonia.

When this decomposition occurs, the amount of aluminum nitride present in the mixture becomes smaller than the amount initially incorporated therein. The sintered article finally obtained, therefore, fails to acquire properties as expected and suffers from dispersion of properties. Moreover, the offensive odor which emanates from the shaped article because of the evolution of ammonia seriously impairs the work environment. Consequently, when the blended material of silicon nitride containing aluminum nitride is subjected to slip casting, the blend must be converted into a slurry using an organic solvent. This unavoidable of the organic solvent results in additional cost.

Aluminum nitride functions effectively as a sintering aid particularly when the sintered article of silicon nitride is produced by sintering in a furnace. Thus, the desirability of developing a method which effects slip casting inexpensively with use of aluminum nitride as the sintering aid has been increasingly recognized.

SUMMARY OF THE INVENTION

It is an object of the present invention to eliminate the aforementioned disadvantages suffered by the prior art. It has been found that a spinel type compound having oxygen dissolved in aluminum nitride to form a solid solution [$(AlN)_X(Al_2O_3)_Y$], or a poly-type aluminum nitride (Al-Si-O-N), is highly stable in water. The discovered spinel-type compound is stable enough to avoid being decomposed with evolution of ammonia during the course of mixing, grading, and slip casting. When this compound is used in place of aluminum nitride (AlN), it functions as a sintering aid as effectively as does aluminum nitride (AlN).

It is another object of the present invention to provide a method for the production of a sintered article of silicon nitride incorporating therein as a sintering aid a compound which avoids being decomposed during the course of mixing, grading, and slip casting in water and performs the role of a sintering aid as effectively as aluminum nitride.

In accordance with the above objects, there has been provided a method for the production of a sintered article of silicon nitride comprising mixing silicon nitride powder with a sintering aid containing either a spinel type compound having oxygen dissolved in aluminum nitride to form a solid solution [$(AlN)_X(Al_2O_3)_Y$], (wherein X has a value in the range of 0.8 to 1.2 and Y a value in the range of 0.8 to 1.2), or a poly-type aluminum nitride (Al-Si-O-N), (wherein the ratio of $(Al+Si)/(O+N)$ falls in the range of 5/6 to 1, exclusive of 1), converting the resultant powdered mixture into an aqueous slurry mixture, molding the slurry mixture in a given shape, and sintering the resultant shaped mixture.

DETAILED DESCRIPTION OF THE PREFERRED EMBODIMENTS

Reference will now be made in detail to the preferred embodiments of the invention as illustrated by the accompanying examples.

The spinel type compound having oxygen dissolved in aluminum nitride to form a solid solution according to the present invention is obtained by mixing aluminum nitride powder and aluminum oxide powder in a molar ratio of about 1:1 and allowing the two compounds to react with each other by heating the powdered mixture in a non-oxidative atmosphere at a temperature in the range of 1600° to 2000° C. for 0.5 to 4 hours.

The spinel type compound obtained by this method is represented by the general formula, $(AlN)_X(Al_2O_3)_Y$ wherein X and Y each generally denote 1. Depending on the conditions of the reaction, the values of X and Y are each variable within the range of 0.8 to 1.2.

The poly-type aluminum nitride is obtained by mixing silicon dioxide powder with aluminum nitride powder in an amount calculated to account for 0.1 to 20% by weight, preferably 1 to 10% by weight, based on the powdered mixture and allowing the two compounds to react with each other by heating the resultant mixture in a non-oxidative atmosphere for 0.5 to 4 hours, for example. If the amount of the silicon dioxide powder in the mixture exceeds 20% by weight, the formation of the poly-type aluminum nitride becomes hardly feasible.

The poly-type aluminum nitride used for the present invention is desired to be such that the ratio of $(Al+Si)/(O+N)$ falls in the range of 5/6 to 1 (exclusive of 1). The reason for this specific range is as follows. If this range is not met, the poly-type aluminum nitride will not have the properties of AlN. Examples of the poly-type aluminum nitride are 27R poly-type, 21R poly-type.

According to the present invention, any of the known sintering aids such as oxides of rare earth elements represented by yttrium oxide and aluminum oxide, titanium oxide, zirconium oxide, and magnesium oxide can be used in connection with the spinel compound mentioned above. The amount of the spinel compound having oxygen dissolved in aluminum nitride or the polytype aluminum nitride to be incorporated in the powdered mixture is in the range of 0.5 to 15% by weight, preferably 1 to 10% by weight, based on the weight of the powdered mixture. When the amount of the compound falls within this range, the sintered article of silicon nitride acquires outstanding mechanical strength.

According to the present invention, the oxide of a rare earth element like yttrium oxide is desirably incorporated in an amount of 0.5 to 10% by weight, preferably 1 to 7% by weight, and/or aluminum oxide is desirably incorporated in an amount of not more than 10% by weight, preferably 2 to 5% by weight in addition to the spinel type compound having oxygen dissolved in aluminum nitride to form a solid solution or the polytype aluminum nitride.

In the present invention, the aforementioned sintering aid is mixed with silicon nitride in water. The resultant mixture, after grading as required, is converted into a slurry. This slurry mixture is moled in a prescribed shape. The proper amount of water to be incorporated in the slurry generally falls in the range of 150 to 450 g, preferably around 300 g, per 1 kg of the powdered mixture. The molding of the slurry is desirably carried out by the slip casting method. Otherwise, the molding method of spraying may be adopted.

The shaped article produced by the molding of the slurry mixture is sintered in a non-oxidative atmosphere at a temperature in the range of 1600° C. to 1800° C.

The sintered article of silicon nitride produced as described above acquires properties substantially equal to the properties of the conventional sintered article obtained by mixing silicon nitride with AlN as a sintering aid, converting the resultant mixture into a slurry using an organic solvent, molding the slurry in a prescribed shape, and sintering the shaped slurry. Since none of the components of the powdered mixture undergoes decomposition during the course of mixing, grading, or slip casting in water, the sintered article of silicon produced acquires stable properties. Since the shaped article avoids emitting ammonia gas during the course of sintering, the production of the sintered article of this invention does not impair the work environment.

Now, the present invention will be described more specifically below with reference to working examples. It should be noted, however, that this invention is not limited in any sence by these working examples.

EXAMPLE 1

A powdered mixture consisting of 88% by weight of silicon nitride powder containing 92% of α-phase silicon nitride and having an average particle size of 1.2 μm, 5% by weight of yttrium oxide powder having an average particle size of 0.7 μm, 2% by weight of aluminum oxide powder having an average particle size of 0.3 μm, and 5% by weight of a spinel type compound of a composition formula, $(AlN)_x(Al_2O_3)_y$, (wherein $x=1$ and $Y=1$). The mixture was placed in a ball mill (using a pot of $Al_2O_3$ with water and balls of $Al_2O_3$), blended therein for 48 hours, and subjected to grading to produce a slurry mixture. The aforementioned spinel type compound had been produced by mixing 29% by weight of aluminum nitride powder and 71% by weight of aluminum oxide powder, heating the resultant powdered mixture in a nitrogen atmosphere at 1800° C. for one hour to effect reaction of the two compounds, and pulverizing the resultant reaction mixture.

The aforementioned slurry was mixed with sodium alginate and a surfactant added thereto as a binder in an amount of 7.5% by weight based on the total weight of the powdered mixture. The resultant mixture was molded by the slip casting method in the shape of a square block measuring 37 mm×37 mm×10 mm.

When the spinel type compound in the shaped article was analyzed by X-ray, it was confirmed that the spinel structure remained unimpaired.

Thereafter, the shaped article was dried, degreased in a nitrogen gas atmosphere at a maximum temperature of 500° C., and sintered in the nitrogen gas atmosphere at 1780° C. for two hours, to afford a sintered article of silicon nitride. The sintered article of silicon nitride so produced was found to have density of about 3.24 g/cc (average for five samples) and flexural strength of 95 kg/mm$^2$ at ordinary temperature and 88 kg/mm$^2$ (average for five samples) at 1000° C.

Separately, a slurry was obtained by following the procedure described above, except that aluminum nitride (AlN) was used in place of the spinel type compound. When this latter slurry was left standing for one day, the aluminum nitride (AlN) underwent hydrolysis with evolution of ammonia.

The high-temperature strength exhibited by the sintered article of silicon nitride obtained in the present example was equal to that of a sintered article of silicon nitride obtained by repeating the procedure described above using aluminum nitride in place of the spinel type compound.

EXAMPLE 2

Silicon nitride power containing 92% of α-phase silicon nitride and having an average particle size of 1.2 μm, yttrium oxide power having an average particle size of 0.7 μm, aluminum oxide powder having an average particle size of 0.3 μm, and 27R poly-type AlN weighed out in amounts meeting a varying percentage composition shown in the following table and water were mixed in a ball mill (using a pot of $Al_2O_3$ and balls of $Al_2O_3$) for 48 hours and subjected to grading, to afford a slurry mixture. The aforementioned 27R poly-type AlN had been produced in advance by mixing 95% by weight of aluminum nitride powder and 5% by weight of silicon oxide powder, heating the resultant powdered mixture in a nitrogen atmosphere at 1950° C. for about one hour, and pulverizing the resultant reaction mixture.

The aforementioned slurry was mixed with a sodium alginate type binder of an amount of 7.0% by weight based on the total amount of the powdered mixture and then molded by the slip casting method in the shape of a square block measuring 37 mm×37 mm×10 mm.

The 27R poly-type AlN found in the shaped article, upon X-ray analysis, was found to retain its original structure.

Thereafter, the shaped article was dried and degreased in a nitrogen atmosphere at a maximum temperature of 500° C. and sintered in a furnace filled with nitrogen gas at 1780° C. for two hours, to afford a sintered article of silicon nitride. The properties (average for five samples) of the sintered article of silicon nitride so produced were as shown in the following table.

| Composition (% by weight) | | | Density (g/cc) | Three-point flexural strength (kg/mm²) |
|---|---|---|---|---|
| $Y_2O_3$ | $Al_2O_3$ | Poly-type AlN | | |
| 5 | 2 | 4 | 3.26 | 85 |
| 7 | 2 | 2 | 3.27 | 96 |
| 7 | 3 | 3 | 3.27 | 94 |
| 5 | 3 | 3 | 3.26 | 98 |

Separately, a slurry was obtained by following the procedure of this example, except that aluminum nitride (AlN) was used in place of the 27R poly-type AlN. When this slurry was left standing for one day, the aluminum nitride (AlN) underwent hydrolysis with evolution of ammonia.

The flexural strength exhibited by the sintered article of silicon nitride obtained in this example was equal to that manifested by a sintered article of silicon nitride obtained by following the procedure of the present example and using aluminum nitride in place of the 27R poly-type AlN.

It is noted from the examples cited above that the present invention permits a notable saving in the cost of molding of the sintered article of silicon nitride ceramic using aluminum nitride as a sintering aid, because the aluminum nitride does not undergo decomposition even when the powdered mixture is converted into an aqueous slurry.

What is claimed is:

1. An aqueous slurry method for the production of a sintered article of silicon nitride ($Si_3N_4$) comprising the steps of:
    mixing silicon nitride powder with from 0.5 to 10% by weight, based on the powdered mixture, of a powdered spinel type compound having oxygen dissolved in aluminum nitride to form a solid solution having the formula $(AlN)_x(Al_2O_3)_y$ wherein x and y each has a value in the range of 0.8 to 1.2;
    converting the resultant powdered mixture into an aqueous slurry mixture; molding said aqueous slurry mixture into a prescribed shape; and
    sintering the resultant shaped mixture.

2. A method according to claim 1, wherein said powdered mixture additionally incorporates therein 0.5 to 10% by weight of an oxide of a rare earth element and not more than 10% by weight of aluminum oxide.

3. A method according to claim 1 wherein said sintered article has a density of at least 3.24 g/cc.

* * * * *